(12) United States Patent
Pellenc et al.

(10) Patent No.: US 10,916,743 B2
(45) Date of Patent: Feb. 9, 2021

(54) ELECTRIC BATTERY DEVICE, FOR BATTERY SUPPORT

(71) Applicant: PELLENC, Pertuis (FR)

(72) Inventors: Roger Pellenc, Pertuis (FR); Frédéric Fortier, La Bastide des Jourdans (FR)

(73) Assignee: PELLENC, Pertuis (FR)

( * ) Notice: Subject to any disclaimer, the term of this patent is extended or adjusted under 35 U.S.C. 154(b) by 65 days.

(21) Appl. No.: 16/317,697

(22) PCT Filed: Aug. 28, 2017

(86) PCT No.: PCT/FR2017/052292
§ 371 (c)(1),
(2) Date: Mar. 13, 2019

(87) PCT Pub. No.: WO2018/050981
PCT Pub. Date: Mar. 22, 2018

(65) Prior Publication Data
US 2019/0229308 A1    Jul. 25, 2019

(30) Foreign Application Priority Data

Sep. 13, 2016  (FR) ...................................... 16 58492

(51) Int. Cl.
*H01M 2/10* (2006.01)
*B25F 5/02* (2006.01)

(52) U.S. Cl.
CPC ............. *H01M 2/1022* (2013.01); *B25F 5/02* (2013.01); *H01M 2/1005* (2013.01); *H01M 2/1061* (2013.01); *H01M 2220/30* (2013.01)

(58) Field of Classification Search
None
See application file for complete search history.

(56) References Cited

U.S. PATENT DOCUMENTS

| | | | |
|---|---|---|---|
| 9,711,765 B1* | 7/2017 | Ladd | H01M 10/0525 |
| 2006/0082959 A1* | 4/2006 | DeLuga | G06F 1/1632 |
| | | | 361/679.41 |

(Continued)

FOREIGN PATENT DOCUMENTS

| | | | | |
|---|---|---|---|---|
| EP | 2323197 A2 * | 5/2011 | ............ | H01M 2/305 |
| EP | 2323197 A2 | 5/2011 | | |

(Continued)

OTHER PUBLICATIONS

EP-2323197-A2 English Machine Translation (Year: 2011).*
JP-2002291111-A English Machine Translation (Year: 2002).*
International Search Report for PCT/FR2017/052292.

*Primary Examiner* — Scott J. Chmielecki

(74) *Attorney, Agent, or Firm* — Egbert Law Offices, PLLC

(57) ABSTRACT

An electric battery device including: a battery attachment plate, at least one battery coupled to the battery attachment plate, the battery having a main face applied against the plate in at least one attachment position on the plate, and a gripping handle of the battery, rigidly secured to the battery, attachment members for attaching the battery on the attachment plate, in the attachment position, at least one lock for locking the battery in the attachment position and at least one release member for releasing the lock, characterised in that the lock is secured to the battery and the release member of the lock is arranged on a portion of the battery intended for the battery gripping handle, for gripping the battery and simultaneous actuation of the lock release member using just one hand.

11 Claims, 5 Drawing Sheets

(56) References Cited

U.S. PATENT DOCUMENTS

| | | | |
|---|---|---|---|
| 2010/0136425 A1 | 6/2010 | Gau et al. | |
| 2011/0278956 A1* | 11/2011 | Eckhoff | H02J 4/00 307/149 |
| 2015/0041512 A1* | 2/2015 | Rief | A45F 3/04 224/633 |

FOREIGN PATENT DOCUMENTS

| | | | |
|---|---|---|---|
| EP | 2886006 A1 | | 6/2015 |
| JP | 2002291111 A | * | 10/2002 |
| JP | 2002291111 A | | 10/2002 |
| JP | 2014017099 A | | 1/2014 |

* cited by examiner

ELECTRIC BATTERY DEVICE, FOR BATTERY SUPPORT

TECHNICAL FIELD

The present invention concerns a support device for a battery of an electric; accumulators. Such a device is provided for temporarily holding an electric battery for the purpose of supplying electric energy to an equipment or a tool. The device can also hold the battery for charging the battery or storing it. The invention finds applications in the field of portable electric equipment and tools energized by a self-contained battery which is to say a removable battery which is not integrated into the body of the equipment or tool it is intended for.

STATE OF PRIOR ART

Significant advances in respect to capacity increases and weight reduction of electric batteries have favored the development of high-powered battery-operated tools or equipment.

As a matter of fact equipment such as field mowers or tools such as chain saws are available with electric motors with a power of more than 2000 watts and energized by a battery of electric accumulators. Use of batteries for high-powered tools traditionally equipped with thermal engines remains however incompatible with the integration of the battery in the body of the tool itself.

The batteries are therefore generally separated from the tool in order to keep the weight and maneuverability of the tool compatible with prolonged use. Using separated batteries also facilitates replacement of a failing battery should that become necessary.

A separated battery may be carried, for example, at the belt or on the back of an operator. It is then connected to its intended tool with a short electric cord. The battery is generally associated to a support device so as to adapt it to a belt or a carrying harness.

A battery support device may also exist on an equipment such as an electric field mower for attaching the battery when it is connected to the equipment motor. The discharge time and the cost of a battery being dependent on its capacity, it allows the user to select the battery (that suits his budget and needs.

A battery fastening device provided with a carrying harness is known, for example from document EP-A-2886006, In this document, the battery is fastened to a support device by displacing the battery from a high to a low position on a flared slide of the support device. The battery can only be put in place in a single position, its handle remaining turned upward on the carrying harness. When the battery is removed from its support device, the latter must be held by one hand while the other hand is used to grip the handle a the battery by exerting an upward effort in order to disengage the battery from the slide.

DISCLOSURE OF THE INVENTION

The present invention proceeds from the identification of a certain number of requirements so as to ensure not only ease but also safety of Use of the equipment or tools associated to a self-contained electric battery.

It is thus a major aim of the invention to propose a battery support enabling the attachment and removal of the battery with only one hand.

The possibility of performing the attachment and the removal of the battery with only one hand meets the need of ease for the operator but also a need for safety by relieving the operator of his portable electric equipment in case of an incident.

Another aim of the invention is to propose a device that is adapted to the use of a battery with different tools, and in particular with tools worn on the belt, tools carried on the harness and tools carried by hand.

Yet another aim of the invention is to propose a battery support that is adapted to different working postures of the operator, for example a stooped posture, a crouched posture, a post: re with bent arms or a posture with arms stretched upward.

To attain these aims, the invention more precisely proposes an electric battery device which comprises:

a battery attachment plate;

at least one battery coupled to the battery attachment plate, the battery presenting a main face applied against the plate in at least one attachment position on the plate, and a battery-gripping handle rigidly integral with the battery;

attachment elements of the battery on the attachment plate, in the attaching position; at least one lock for locking the battery in the attachment position; and at least one lock releasing element.

According to the invention;

the lock is integral with the battery; and the lock releasing element is placed on a part of the battery that is provided with the battery gripping handle, for seizing the battery and an accompanying operation of the lock releasing element with only one hand.

"Battery" is understood to mean an assembly formed by a battery of electric accumulators and a case housing these electric accumulators.

The case may be metallic or, preferably, of a plastic material. The battery gripping handle is considered to be rigidly integral with the battery when it is rigidly integral with its case or formed of one piece with the case or a part of the case.

Also, the lock release element is considered to be mounted on a part of the battery provided with the handle when it is placed on the handle or when it is placed at a sufficiently small distance from the handle so it can be operated while gripping the handle. The lock release element must at least be reachable by one finger of the hind gripping the handle.

The lock release element, when it is operated by the operators hand makes it possible to act on the lock or at least on a mobile part of the lock. The lock or at least its mobile part is integral with the battery and in particular with the battery case.

By placing the lock on the battery, it is possible to manufacture uncomplicated and inexpensive attachment plates.

Thus, the attachment plates can be mass-produced and provided on a variety of electric equipment or supports suitable for holding the battery.

Preferably, the release element can be integrated directly in the handle and in a position allowing its intuitive actuation when the handle is gripped. The lock release element may in particular be mounted in mobile fashion on the gripping handle. This consists, for example, of a button placed on the upside of the handle and which can be actuated by the thumb of the operator's hand. It may also be a pressure bar located under the handle in its middle and seized in this case by the fingers wrapped around the underside of the handle. The button or the pressure bar may also be positioned at other parts of the handle or in proximity of the latter while being accessible by the hand gripping the handle of the battery and in a position which avoids an undesirable triggering of the release element in the event of an encounter with an object outside the battery.

These characteristics, besides the fact that they permit a single-hand actuation also enable a rapid and intuitive release of the battery in case of an emergency.

While its release element its positioned in proximity of the handle, the lock it is not necessarily within reach of the operators hand.

It should be noted that the battery may be provided with two locks, two handles and two release elements associated respectively with the two locks. In this case, the locks are preferably so configured that the release of only one of them allows the separation of the battery from the attachment plate.

Moreover, the handles and lock release elements may preferably be positioned on opposite sides of a housing or shell of the battery so as to dispose of a handle turned upward in two opposite attachment positions of the battery on the battery attachment plate. These positions are described below.

The attachment elements of the battery on the battery attachment plate ensure maintaining the battery on the attachment plate, in combination with the lock, so as to prevent a relay movement of the battery in relation to the attachment plate.

According to a particular implementation of the device, the attachment elements of the battery on the attachment plate may include:

at least one first attachment element and at least one second attachment element, the first attachment element and the second attachment element being positioned on the battery attachment plate;

at least one third attachment element and at least one fourth attachment element, the third attachment element and the fourth attachment element being positioned on the battery and configured for an engagement with the first attachment element and with the second attachment element when a main face of the battery is applied against the battery attachment plate.

The main face of the battery and the part of the battery attachment plate which is coupled to it, are preferably essentially plane.

The battery attachment and attachment plate elements may present a certain symmetry. In particular, the first and the second attachment elements integral with the attachment plate may present a symmetry relative to a plane perpendicular to the attachment plate, and the third and forth attachment elements integral with the battery may present a corresponding symmetry relative to a plane perpendicular to the main face of the battery. The symmetric planes considered here are preferably merged into one when the battery is in place on the attachment plate.

The symmetry of the attachment elements is not necessarily a strict symmetry in the geometric sense of the term, but sufficient to enable permutation between the attachment elements. The symmetry thus permits considering several attachment positions.

In particular one can distinguish:

a first attachment position in which the first attachment element of the battery attachment plate is engaged with the third battery attachment element and the second attachment element of the battery attachment plate is engaged with the fourth attachment element of the battery: and a second attachment position in which the first attachment element of the battery attachment plate is engaged with the fourth battery attachment element and the second attachment element of the battery attachment plate is engaged with the third attachment element of the battery.

The two positions correspond to orientations of the battery on the battery attachment plate, opposite at an angle of 180 degrees. In the two attachment positions, the main face of the battery is turned towards the plate and applied against the plate.

The battery can be mounted in one of the head-to-tail positions to each other so as to adapt, for example, to a standing, raised-arms posture or a stooped posture of the operator, or to adapt to different tools carried above or below the operator's waist.

In effect, the opposite positions of the battery can serve to orient the electric power cord of the battery either upward or downward. The terms upward and downward are here to be understood in relation to a vertical carrying of the battery. The opposite positions of the battery can also serve for a displacement of the center of gravity of the battery in relation to the battery attachment plate and a possibly present harness carrying this plate. This aspect is taken up below.

According to a possible particular implementation of the device of the invention, the first attachment element and the second attachment element may each feature an attachment hook. In that case, the lock may feature a trigger coupled to the attachment hooks so as to insert itself in one or the other of the hooks in a locked position.

Although it can be independent of the attachment elements, the lock trigger can also form one of the third and/or fourth attachment elements.

The attachment elements may present themselves generally in the form of hooks, in the manner indicated above, but also in the form of rails or protuberances presenting a relief with complementarity of shape. The complementarity of shape is understood to be between the attachments elements of the plate and of the battery, respectively, or also between one or several attachment elements and the trigger of the lock.

The lock is not necessarily a trigger lock, it may also be a twistlock, an eccentric lock or a bolt lock acting on the battery attachment plate. In all these cases, a releasing element of the lock, for example a button, a bar or a thumbwheel for example, are configured for a lock release concomitant with the gripping of the handle.

As mentioned earlier, the battery presents a main face meant to come into contact with the battery attachment plate in the attachment position, and a gripping handle of the battery. Advantageously, the gripping handle of the battery may be offset in the direction of the main face, relative to the center of gravity of the battery. More precisely, the handle may be offset in the direction of the main face relative to a plane parallel to the main face and passing through the center of gravity.

In particular, the battery gripping handle may be positioned between a first plane passing through the main face of the battery, and a second plane, parallel to the first plane and passing through a center of gravity of the battery.

In this configuration, when the battery is being carried by its handle and its center of gravity is located below the handle, the main face of the battery is not vertical but presents an angle relative to the vertical due to the offset of the handle towards the main face, relative to the center of gravity of the battery.

The angle of inclination has the effect of exposing primarily, relative to the vertical, at least on of the battery attachment elements, in this circumstance the lowest one, that is to say the farthest one from the handle. This exposure facilitates its engagement with a corresponding attachment element of the attachment plate when the battery is brought close to the attachment plate.

The battery is thus able to fit into its place in a very natural and intuitive manner on a vertical attachment plate.

When one of the battery attachment elements is engaged on an attachment element of the plate, the installation continues by applying the main face of the battery on the attachment plate until the other attachment elements and, if applicable, the lock, are engaged. It involves a pivoting movement around an axis passing through the first engaged attachment element(s), between the inclined position and a position parallel to the attachment plate.

The battery attachment plate of the device of the invention may be integral with a storage support, an electrical equipment or a vehicle running on battery-supplied energy such as an electric mower, for example.

According to another possibility, the device of the invention may feature a carrying harness for the battery. In this case the attachment plate is integral with the harness. The plate is for example coupled with harness straps and carried on the operator's back. The same harness may also be provided with fasteners or, straps for the attachment of heavy tools such as brush removal tools, earth working tools or blowers.

The device may also feature an electrical connector coupled electrically to the battery by an electric cord and attached to the harness through a removable fastener. The connector makes it possible to connect different tools to the battery. In other applications, the connector may be connected with a connector coupled to an electric equipment, for example an electric mower that needs to be supplied with power.

The electric cord may be plugged into the battery on one side of the battery turned towards the handle; it is thus possible to seize with one hand the battery and the electric cord. Furthermore, the orientation of the battery carried by the handle or attached on the attachment plate then also lets one determine the position of the electric cord.

Other characteristics and advantages of the invention become evident from the following description with reference to the figures of the drawings. This description is given for illustrative purposes and is non-limiting.

The drawings of the figures are shown in free scale.

DETAILED DESCRIPTION OF IMPLEMENTATIONS OF THE INVENTION

In the following description, the terms "high" and "low" refer to a position of the battery as it is carried on the back of an operator.

Identical or similar parts of the various figures are marked with the same reference marks so as to facilitate the transfer from one figure to the next.

Figure 1A:
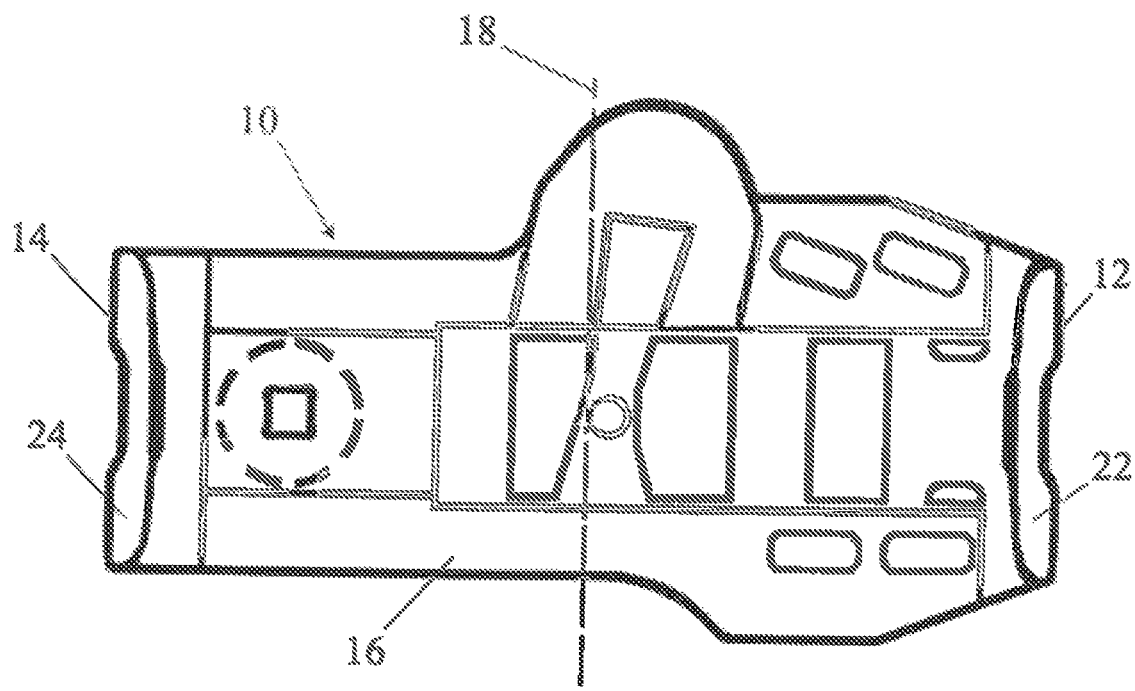
FIG. 1A is a plan view f an attachment plate of a device according to the invention.

FIG. 1A shows a battery attachment plate 10 of the device of the invention. The plate 10 is made of plastic material. It presents a first and a second battery attachment element 12, 14 protruding on a main face 16 of the plate for the purpose of receiving a battery. A back face of the plate, opposite the main face 16, is intended to be made integral with a support, and in particular a harness described below.

The attachment elements present a symmetric disposition and configuration relative to a plane 18 perpendicular to the main face of the attachment plate.

Figure 1B:
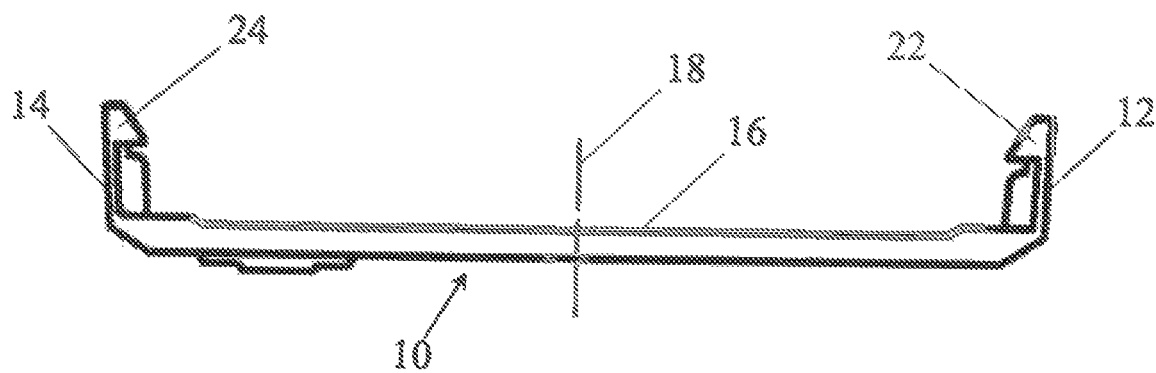
FIG. 1B is a cross view of the attachment plate of FIG. 1A.

FIG. 1B shows more clearly the attachment elements 12, 14 protruding on the main face 16 of the plate 10. One can observe that the attachment elements present hooks 22, 24 turned towards each other and towards the symmetry plane 18.

Figure 2:
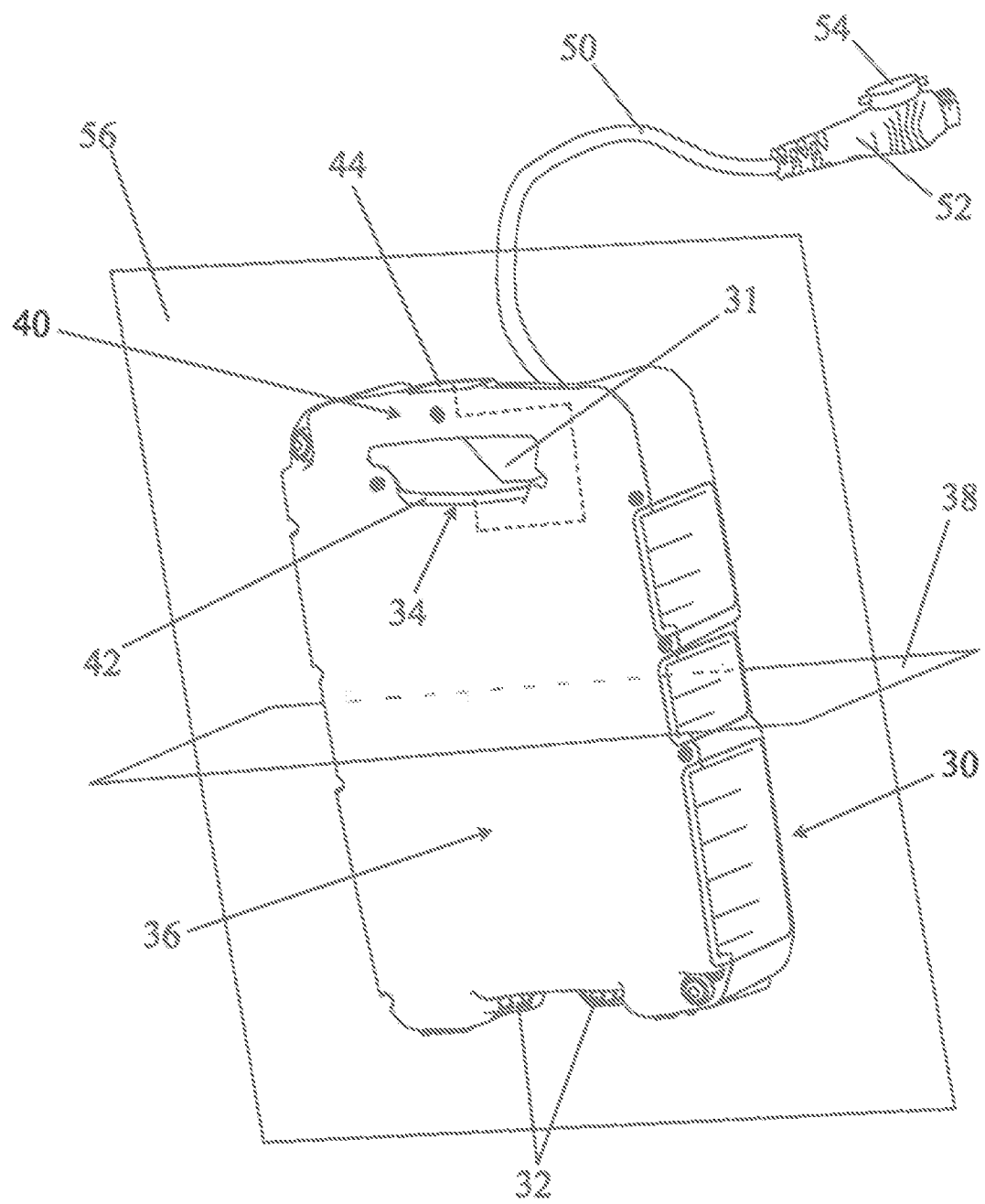
FIG. 2 is a perspective view of a battery coupled to the attachment plate of FIGS. 1A and 1B.

FIG. 2 shows a battery 30 intended to be attached to the attachment plate 10. The battery presents a third attachment element 32 and a fourth attachment element 34 placed in proximity of a main face 36 of the battery which is to come into contact with the main face 16 of the attachment plate.

The third attachment element 32 presents itself here in the form of two protrusions of the shell forming one battery base. The third attachment element may be made of plastic in the extension of the battery shell.

The fourth attachment element 34 presents itself in the form of a trigger 42, mounted in sliding and retractable fashion in the battery shell opposite the third attachment element. It protrudes in an open-worked portion 31 of the shell forming a handle 40 of the battery. The trigger 42 may be made of metal or plastic, for example.

The third and fourth attachment elements present essentially symmetric parts, in their shape and/or their layout, relative to a plane 38 perpendicular to the main face of the battery.

Whereas the third attachment element is fixed, the fourth attachment element includes the trigger 42 which is movable.

The trigger 42 forms a lock or at least the mobile part of the lock. The trigger 42 is considered to be a lock to the extent that it is capable of occupying a locking position preventing the separation of the battery from the battery attachment plate. This position is occupied when the trigger is engaged with one of the attachment elements of the battery attachment plate.

The trigger 42 is cocked in the locking position by a spring not visible in the figure. It is, furthermore, linked to an actuation element 44 positioned on the handle 40 here in the form of a push-button. The actuation element 44 serves to temporarily displace the trigger 42 from the locking position to a retracted position inside the battery shell to allow removing the battery from the attachment plate. The actuation element 44 of the trigger 42 thus constitutes a release element of the lock.

An electric cord 50 connects the battery 30 to a connector 52 for a connection of the battery to an electric equipment that needs to be supplied with energy. The connector is provided with a removable attachment 54, so the connector can also be attached to a support, for example a harness, described below, so as to maintain the connector relative to its support and to facilitate a branching operation of an equipment to the connector.

The carrying position of the battery may be the one shown in FIG. 2. In this position, the handle 40 is located above the center of gravity of the battery and the main face 36 of the battery 30 is essentially vertical.

It can be observed that the handle 40 is located closer to the main face 36 of the battery than to the face opposite the main face 36. The handle 40 is in fact offset in the direction of the main face, relative to a plane 56, parallel to the main face 36, and passing through the center of gravity.

In the example of the figures, the handle is located between the plane 56 containing the center of gravity and a plane passing through the main face. The handle may even be further offset and beyond the plane passing through the main face.

The offset of the handle relative to the center of gravity has the effect of giving the battery a natural inclination relative to the vertical when it is held by its handle. This inclination can be used advantageously as shown on FIGS. 3A, 3B for installing the battery on the attachment plate.

Figure 3A:
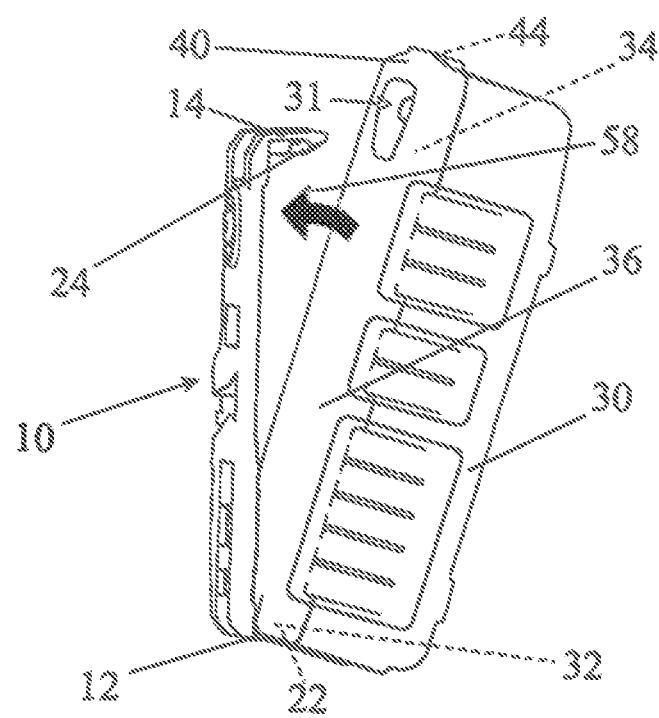
FIG. 3A is a schematic representation of an installation operation of the battery on the attachment plate.

FIG. 3A shows a battery attachment plate 10 in a vertical position for example a plate mounted on a harness (not shown) placed on the ground. The natural inclination of the battery 30, held by the handle, allows to engage first the third attachment element 32 at the bottom of the battery 30 on the first attachment element 12 of the attachment plate. The main face 36 of the battery 30 is then lowered against the attachment plate to bring about the engagement of the fourth attachment element 34 of the battery on the second attachment element 14 of the plate. This movement is indicated by an arrow 58.

Figure 3B:
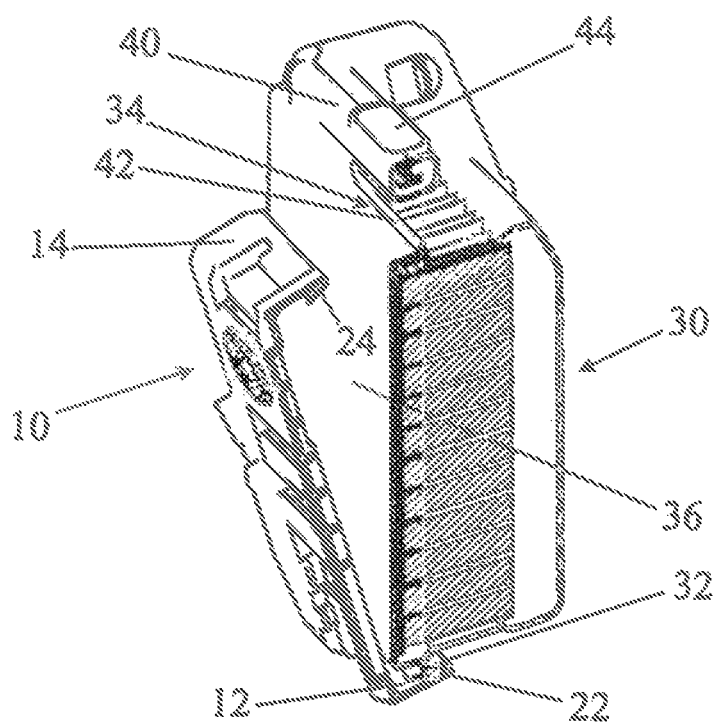
FIG. 3B is a sectional view of the device in FIG. 3A.

FIG. 3B is a section view of FIG. 3A in a vertical plane perpendicular to the plane of the main face 36 of the battery and passing through the third attachment element 32. It makes it easier to visualize the cooperation between the first attachment element 12 of the attachment plate 10 and the third attachment element 32 of the battery 30 by means of the hook 22.

Figure 4:
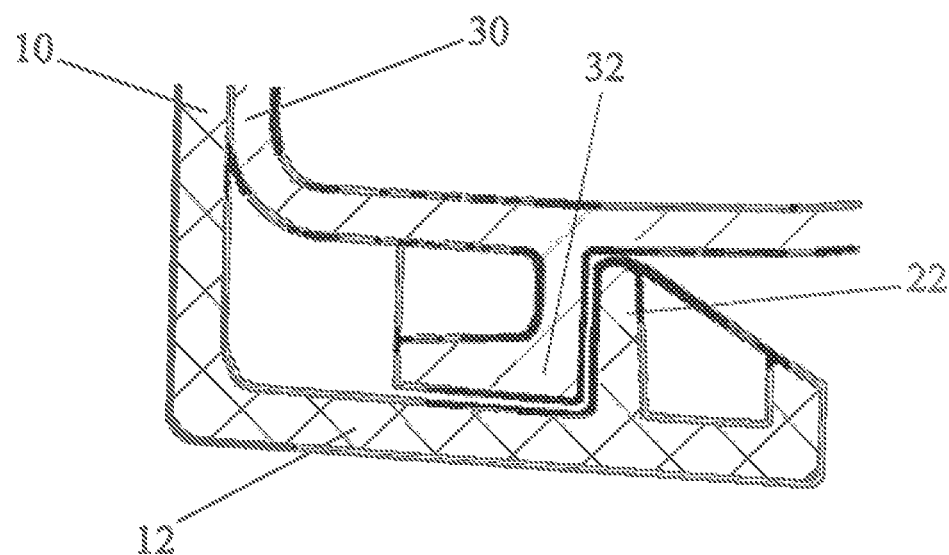
FIGS. 4 and 5 are sectional views of details ref attachment and locking elements of the battery and the attachment plate.

FIG. 4 is a section view at a larger scale showing the engagement of the third attachment element 32 of the battery on the first attachment element 12 of the attachment plate 10.

The third attachment element 32 is placed opposite the handle at the bottom of the battery, is here formed by two protuberances in the extension of the shell of the battery 30, each presenting itself in the shape of a rail. The third attachment element inserts itself behind the hook 22 which is formed by the first attachment element 12 of the attachment plate 10.

Figure 5:
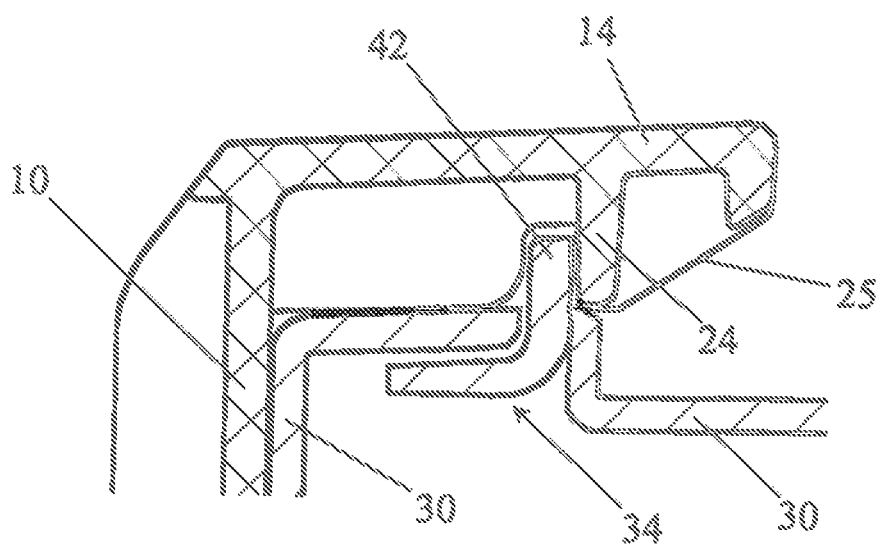

FIG. 5 is a section view at a larger scale showing the engagement of the fourth attachment element 34 of the battery 30 on the second attachment element 14 of the attachment plate 10. The fourth attachment element 34 which here is formed by the trigger 42 of the lock positions itself behind the hook 24 of the second attachment element 14 of the attachment plate 10.

At the beginning of the engagement of the fourth attachment element 34 on the second attachment element 14, a ramp 25 of the hook 24 allows pushing back the trigger 42 of the lock as it hits the spring (not visible) which cocks the trigger. When the battery is in place, the trigger is separated from the ramp 25 and positions itself behind the hook 24 of the second attachment element 14, as indicated above.

Releasing the battery requires an action on the actuation element 44 visible in FIGS. 2, 3B and which constitutes a release element. Action on the actuation element 44 permits in effect retracting the trigger in order to disengage it from the hook 24.

It should be noted that the third element of attachment can be made in the same shape as the fourth element of attachment and also feature a trigger and an associated release element. In that case a second handle, symmetric to the first handle, may also be provided.

Because of the symmetrical configuration of the attachment elements relative to planes 18 and 38 visible on FIGS. 1A, 1B and 2, the engagement of the attachment elements can be opposite. In other words, the fourth battery attachment element may be engaged on the first attachment element of the attachment plate and the third battery attachment element may be engaged on the second attachment element of the attachment plate.

In that case the position of the battery on the attachment plate is opposite at an angle of 180 degrees along a plane parallel to the main face of the battery.

Figure 6A:
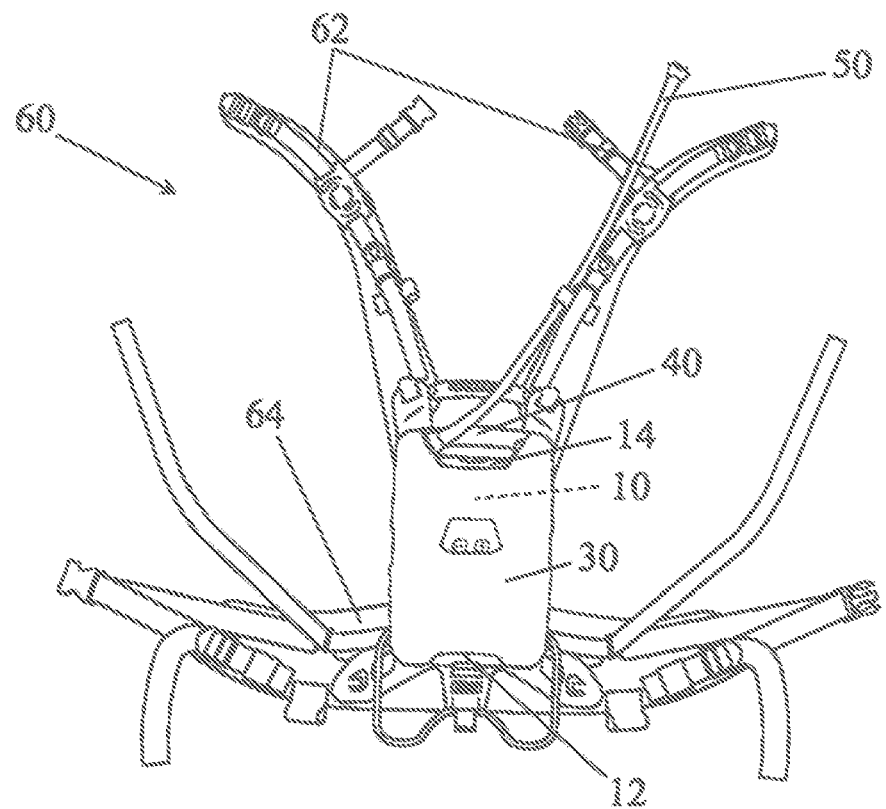
FIGS. 6A and 6B are plan views of the device of the invention provided with a carrying harness and illustrate two attachment positions of the battery.
Figure 6B:
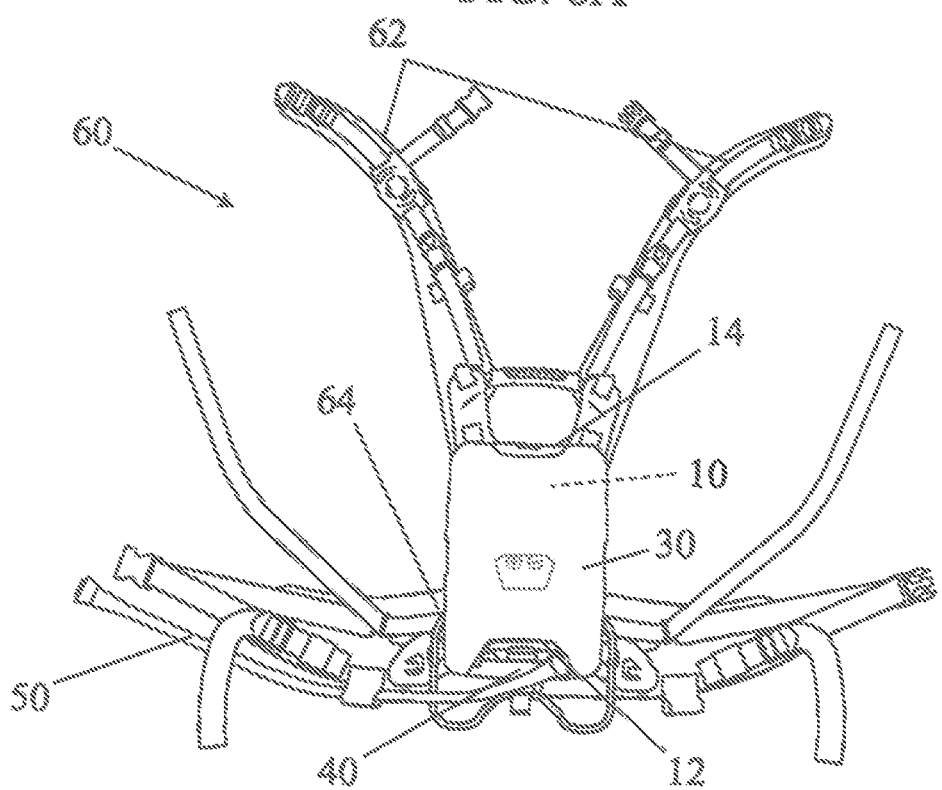

The two battery positions, one with the handle 40 pointing upward and the other with the handle 40 pointing downward, are represented in FIGS. 6A and 6B.

FIGS. 6A and 6B show the device of the invention equipped with a harness 60 and on which a battery 30 is attached. The harness 60 comprises essentially shoulder straps 62 and a carrying belt 64. The shoulder straps and the belt are integral with the attachment plate 10, the latter not being visible because it is located behind the battery 30.

In the position of the battery with the handle 40 pointing upward, the electric cord 50 may, as shown on FIG. 6A, run alongside one of the shoulder straps 62 and be attached to it, for supplying power to a hand-carried tool, for example.

The other way around, in the position of the battery with the handle 40 pointing downward, the electric cord 50 may, as shown in FIG. 6B, run alongside the belt 64 and be attached to it for supplying power to a tool worn at the belt or at the waist. The comparison of FIGS. 6A and 6B also shows that the height of the battery relative to the harness is not the same in the two opposite positions. In effect, the plane of symmetry 38 of the battery attachment elements visible on FIG. 2 is not necessarily a median plane of the battery and does not necessarily contain the center of gravity of the battery. Thus, the choice of orientation of the battery also allows displacing its center of gravity relative to the harness and adapting it to a posture of the operator, for greater ease of carrying.

The invention claimed is:

1. An apparatus comprising:
   a battery attachment plate;
   at least one battery coupled to said battery attachment plate, said at least one battery having a main face applied against said battery attachment plate in at least one attachment position on said battery attachment plate;
   a gripping handle rigidly integral with said at least one battery, said gripping handle being offset from and adjacent to the main face of said at least one battery, said gripping handle positioned between a first plane passing along the main face of said at least one battery and a second plane extending through a center of gravity of said at least one battery, the second plane being in parallel planar relationship to the first plane;
   a plurality of attachment elements on said battery attachment plate, said plurality of attachment elements defining a position of attachment;

at least one lock that locks said at least one battery in the position of attachment, said at least one lock being integral with said at least one battery; and at least one release element cooperative with said at least one lock and adapted to release said at least one lock, said at least one release element being positioned on a portion of said at least one battery, the portion of said at least one battery being at said gripping handle, said at least one release element adapted to seize said at least one battery and to be actuated with a single hand.

2. The apparatus of claim 1, wherein said at least one release element is movably mounted on said gripping handle.

3. The apparatus of claim 1, said plurality of attachment elements comprising:
   a first attachment element;
   a second attachment element, said first attachment element and said second attachment element being positioned on said battery attachment plate;
   a third attachment element; and
   a fourth attachment element, said third attachment element and said fourth attachment element being positioned on said at least one battery and configured to engage with said first attachment element and said second attachment element when the main face of said at least one battery is applied against said battery attachment plate.

4. The apparatus of claim 3, said first attachment element and said second attachment element each having an attachment hook, said at least one lock comprising a trigger coupled to the attachment hooks.

5. The apparatus of claim 4, the trigger forming either said third attachment element or said fourth attachment element.

6. The apparatus of claim 1, wherein said gripping handle is positioned between a first plane passing through the main face of said at least one battery and a second plane parallel to the first plane and passing through the center of gravity of said at least one battery.

7. The apparatus of claim 3, wherein said first attachment element and said second attachment element are integral with said battery attachment plate so as to have a symmetry relative to a plane perpendicular to said battery attachment plate, said third attachment element and said fourth attachment element having a corresponding symmetry relative to a plane perpendicular to the main face of said at least one battery.

8. The apparatus of claim 7, further comprising:
   a first attachment position in which said first attachment element of said battery attachment plate is engaged with said third attachment element and the second attachment element is engaged with said fourth attachment element;
   a second attachment position in which said first attachment element is engaged with said fourth attachment element and said second attachment element is engaged with said third attachment element.

9. The apparatus of claim 1, wherein said at least one release element is an actuation bar or an actuation button positioned on said gripping handle.

10. The apparatus of claim 1, further comprising:
    a battery carrying harness, said battery attachment plate being integral with said battery carrying harness.

11. The apparatus of claim 10, further comprising:
    an electrical connector electrically connected to said at least one battery by an electric cord, said electrical connector being attachable to said battery carry harness by a detachable clip.

* * * * *